United States Patent
Tsuboi et al.

(10) Patent No.: US 9,854,484 B2
(45) Date of Patent: Dec. 26, 2017

(54) MOBILE STATION, BASE STATION, AND METHOD FOR MANAGING SYNCHRONIZATION STATE

(75) Inventors: Hidekazu Tsuboi, Osaka (JP); Katsunari Uemura, Osaka (JP); Yasuyuki Kato, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 323 days.

(21) Appl. No.: 14/238,385

(22) PCT Filed: Aug. 7, 2012

(86) PCT No.: PCT/JP2012/070069
§ 371 (c)(1),
(2), (4) Date: Feb. 11, 2014

(87) PCT Pub. No.: WO2013/024743
PCT Pub. Date: Feb. 21, 2013

(65) Prior Publication Data
US 2014/0194126 A1 Jul. 10, 2014

(30) Foreign Application Priority Data

Aug. 12, 2011 (JP) ................. 2011-176624

(51) Int. Cl.
*H04W 36/00* (2009.01)
*H04W 56/00* (2009.01)
*H04W 74/08* (2009.01)

(52) U.S. Cl.
CPC .... *H04W 36/0072* (2013.01); *H04W 56/0045* (2013.01); *H04W 74/0833* (2013.01)

(58) Field of Classification Search
CPC ......... H04W 56/0045; H04W 56/0005; H04W 74/006; H04W 72/0413; H04W 72/042;
(Continued)

(56) References Cited

U.S. PATENT DOCUMENTS

2002/0045451 A1* 4/2002 Hwang ............ H04W 36/0072
455/436
2010/0142485 A1* 6/2010 Lee ...................... H04W 36/02
370/331
(Continued)

FOREIGN PATENT DOCUMENTS

JP 2012-531141 A 12/2012
WO WO 2010/149035 A1 12/2010

OTHER PUBLICATIONS

3GPP TSG-RAN WG2 meeting#68bis Valencia, Spain, Jan. 18-22, 2010 R2-100423.*
3GPP TS 36.300 v10.3.0 (Mar. 2011); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10); pp. 1-197.
(Continued)

*Primary Examiner* — Marsha D. Banks Harold
*Assistant Examiner* — Natasha W Cosme
(74) *Attorney, Agent, or Firm* — Birch, Stewart, Kolasch & Birch, LLP

(57) ABSTRACT

A synchronization state is efficiently managed in a mobile station to which cells are allocated. A base station notifies the mobile station of information about whether or not a transmission timing before a handover for each of cell groups of the mobile station is to be applied after the handover. The mobile station sets whether or not the transmission timing adjusted for each cell group is to be applied after the handover, on the basis of the received information.

2 Claims, 8 Drawing Sheets

(58) Field of Classification Search
CPC ......... H04W 72/0406; H04W 72/0453; H04W 74/0833; H04W 74/002; H04W 28/06; H04W 72/1289; H04W 74/04; H04W 52/34; H04W 24/02; H04W 24/10; H04W 36/0027; H04L 27/2657; H04L 27/2666; H04L 5/0085; H04L 5/0098; H04L 5/001; H04L 5/0032; H04L 5/0091; H04L 1/0003; H04L 1/0026; H04L 5/0053; H04L 5/0057; H04L 5/0073; H04L 5/0094
USPC .......................................... 370/350; 455/437
See application file for complete search history.

(56) References Cited

U.S. PATENT DOCUMENTS

| 2012/0093128 | A1 | 4/2012 | Song et al. | |
| 2012/0257570 | A1* | 10/2012 | Jang | H04L 5/001 370/328 |
| 2013/0303230 | A1* | 11/2013 | Sayana | H04W 24/08 455/524 |

OTHER PUBLICATIONS

3GPP TS 36.321 v10.1.0 (Mar. 2011); 3rd Generation Partnership Project; Technical Specification Group Radio Access Network; Evolved Universal Terrestrial Radio Access (E-UTRA); Medium Access Control (MAC) protocol specification (Release 10); pp. 1-53.
3GPP TSG RAN WG2 Meeting #74, R2-112925, Barcelona, Spain, May 9-13, 2011, 7.1.1, New Postcom, Analysis of PCell change on single and multiple TA scenarios, Discussion and Decision, pp. 1-3.
3GPP TSG-RAN WG2 Meeting #74, R2-113285, Barcelona, Spain, May 9-11, 2011, 7.1.1, Huawei, HiSilicon, Discussion on TA group management, Discussion and Decision, pp. 1-4.
NTT DOCOMO Inc, "CA support for multi-TA", 3GPP TSG-RAN2#69 R2-101567, dated Feb. 26, 2010.
Alcatel-Lucent et al., "Initiating Timing Alignment for SCell in Multiple TA", TSG-RAN WG2#74, Barcelona, Spain, May 9-13, 2011, R2-113235, pp. 1-6.
Renesas Mobile Europe, "Multiple Timing Advance Using Multiple RACH", 3GPP TSG-RAN WG2 Meeting #74, Barcelona, Spain, May 9-13, 2011, R2-113014, 3 pages.

* cited by examiner

MOBILE STATION, BASE STATION, AND METHOD FOR MANAGING SYNCHRONIZATION STATE

TECHNICAL FIELD

The present invention relates to a communication system, a mobile station, a base station, a method for managing a synchronization state, and an integrated circuit, and particularly to a method for managing a synchronization state when a mobile station establishes a radio connection to a base station by using multiple cells.

BACKGROUND ART

In the 3GPP (3rd Generation Partnership Project) which is a standardization project, through adoption of an OFDM (orthogonal frequency-devision multiplexing) communication scheme and flexible scheduling which is called a resource block and which is based on a predetermined frequency and time unit, Evolved Universal Terrestrial Radio Access (hereinafter, referred to as "EUTRA") in which high-speed communication is achieved has been studied, and Advanced EUTRA (also referred to as LTE-Advanced) which is a developed form of EUTRA is being studied.

In Advanced EUTRA, carrier aggregation has been proposed as a technique which enables higher-speed data transfer while maintaining compatibility with EUTRA. Carrier aggregation is a technique in which data which is transmitted from a transmitting device by using different frequency bands (also referred to as "carrier frequencies" or "component carriers") is received by a receiving device supporting the different frequency bands so that the data transmission rate is increased. Hereinafter, a receiving device in downlink transmission is referred to as a "mobile station", and a transmitting device is referred to as a "base station". A receiving device in uplink transmission is referred to as a "base station", and a transmitting device in uplink transmission is referred to as a "mobile station". The scope of application of the present invention is not necessarily limited to these devices. For example, a receiving device in downlink transmission and a transmitting device in uplink transmission may be a relay station.

In Advanced EUTRA, one downlink component carrier and one uplink component carrier are combined so as to form one cell. Instead, a cell may be formed of only one downlink component carrier. A cell is allocated to (configured for) a mobile station through signaling in the RRC layer by a base station. A cell allocated to a mobile station has two states, the deactivated state in which radio transmission is not allowed to be performed and the activated state in which radio transmission is allowed to be performed. A mobile station uses one cell called a primary cell and zero or more cells called secondary cells to communicate with a base station, and the primary cell is always in the activated state. All of the secondary cells allocated to a mobile station are switched to the deactivated state upon occurrence of a handover, and signaling (Activation command) which is performed by a base station after the handover and which represents an explicit instruction for activation causes the secondary cells to be switched to the activated state.

In the case where an initial connection to a base station is to be established, where a handover is to be performed, or where uplink data transmission or downlink data reception needs to be performed in a state in which the uplink is not synchronized, a mobile station in EUTRA performs a process for uplink transmission timing adjustment (uplink synchronization establishment) which is called a random access procedure. In Advanced EUTRA, when multiple cells are allocated to a mobile station, a random access procedure in the primary cell causes the uplink component carriers for all of the cells which are in the activated state to be adjusted to the same transmission timing. There is a timer (referred to as a "transmission timing timer") which is restarted every time an uplink transmission timing is adjusted (a signal for adjusting transmission timing, which is called a TA command, is received from a base station). When the transmission timing timer has counted a predetermined time without being restarted (when the transmission timing timer is completed) or when the transmission timing timer stops due to another reason, the uplink is regarded as being out of synchronization, and the mobile station cannot perform radio transmission other than a random access procedure (see NPL 1).

A third-generation base station defined by the 3GPP is referred to as a "NodeB", and a base station in EUTRA and Advanced EUTRA is referred to as an "eNodeB". A base station manages a cell which is an area in which a mobile station can communicate. A cell is also referred to as a "femtocell", a "picocell, or a "nanocell" depending on the size of the area in which a mobile station can communicate with a base station. When a mobile station can communicate with a certain base station, a cell of the certain base station is a cell in which the mobile station stays, and a cell of another base station or having a different frequency is referred to as a "surrounding cell".

CITATION LIST

Patent Literature

Non Patent Literature

NPL 1: TS36.321v10.1.0 5.1.1, (http://www.3gpp.org/ftp/Specs/html-info/36321.htm)
NPL 2: TS36.300v10.3.0 10.1.5, (http://www.3gpp.org/ftp/Specs/html-info/36300.htm)

SUMMARY OF INVENTION

Technical Problem

As described above, in the current state of Advanced EUTRA, a random access procedure is performed only in a cell called a primary cell, and uplink transmission timings for cells allocated to a mobile station are adjusted to a single timing. Uplink transmission in a secondary cell after a handover has the same timing as that of the primary cell, which needs no complicated control.

However, in the future, when communication in cells using some of the frequencies is performed through a communication apparatus, such as a relay station or a repeater, reception timings of data through downlink component carriers are different in a mobile station depending on the cell (or the cell group which includes one or more cells), and transmission timings for a base station are different depending on the uplink component carrier of the cell (or the uplink component carriers of the cell group). When only either one of uplink communication and downlink communication is performed through the communication apparatus, transmission timings or reception timings are different from each other. Therefore, a mobile station needs to adjust the transmission timing of each cell group so as to manage the synchronization state. In this case, the mobile station has to perform complicated control (management of the synchronization state) of multiple transmission timings when a handover is performed.

In view of the above-described problem, it is an object of the present invention to provide a radio communication system, a mobile station, a base station, a method for managing a synchronization state, and an integrated circuit which enable the synchronization state to be managed efficiently for the mobile station to which cell groups having different timings are allocated.

Solution to Problem (1) To achieve the above-described object, the present invention takes the following measures. In a communication system of the subject application, a base station and a mobile station communicate with each other by aggregating multiple cells having different frequency bands. The cells having different frequency bands are grouped into any one of cell groups, each of which includes cells having an identical transmission timing. The mobile station adjusts the transmission timing of each of the cell groups which are set from the base station. The base station transmits information describing whether or not a transmission timing before a handover for each of the cell groups of the mobile station is to be applied after the handover. The mobile station sets whether or not the transmission timing adjusted for each of the cell groups is to be applied after the handover, on the basis of the transmitted information.

(2) In the communication system of the subject application, the information is information for specifying an activated state or a deactivated state of a cell after the handover, for each of the cell groups or each of cells in the cell group. A transmission timing of a cell group to which the activated state is specified in the information or a cell group including a cell to which the activated state is specified in the information is applied after the handover.

(3) In the communication system of the subject application, the information is information for specifying whether or not a random access procedure is required to be performed after the handover, for each of the cell groups or each of cells of the cell group. A transmission timing of a cell group for which the random access procedure is not required in the information or a cell group including a cell for which the random access procedure is not required in the information is applied after the handover.

(4) In a communication system of the subject application, a base station and a mobile station communicate with each other by aggregating multiple cells having different frequency bands. The cells having different frequency bands are grouped into any one of cell groups, each of which includes cells having an identical transmission timing. The mobile station adjusts the transmission timing of each of the cell groups which are set from the base station. The base station allocates only a cell of a cell group to which the transmission timing of the mobile station is to be applied after a handover, to the mobile station. The mobile station applies the transmission timing of the cell group including the allocated cell to the transmission timing after the handover.

(5) In the communication system of the subject application, a state of the cell to which the transmission timing is applied after the handover is to be continued after the handover.

(6) A mobile station of the subject application communicates with a base station by aggregating multiple cells having different frequency bands. The cells having different frequency bands are grouped into any one of cell groups, each of which includes cells having an identical transmission timing. The mobile station adjusts the transmission timing of each of the cell groups which are set from the base station. The mobile station sets whether or not the transmission timing adjusted for each of the cell groups is to be applied after a handover, on the basis of information which describes for each of the cell groups whether or not the transmission timing before the handover is to be applied after the handover and which is transmitted from the base station.

(7) A mobile station of the subject application communicates with a base station by aggregating multiple cells having different frequency bands. The cells having different frequency bands are grouped into any one of cell groups, each of which includes cells having an identical transmission timing. The mobile station adjusts the transmission timing of each of the cell groups which are set from the base station, and applies the transmission timing of a cell group including a cell allocated upon a handover, to the transmission timing after the handover.

(8) A base station of the subject application communicates with a mobile station by aggregating multiple cells having different frequency bands. The cells having different frequency bands are grouped into any one of cell groups, each of which includes cells having an identical transmission timing. The base station transmits information describing whether or not a transmission timing before a handover for each of the cell groups of the mobile station is to be applied after the handover.

(9) A base station of the subject application communicates with a mobile station by aggregating multiple cells having different frequency bands. The plurality of cells having different frequency bands are grouped into any one of cell groups, each of which includes cells having an identical transmission timing. The base station allocates only a cell of a cell group to which the transmission timing of the mobile station is to be applied after a handover, to the mobile station.

(10) A method of the subject application for managing a synchronization state is a method for a mobile station that communicates with a base station by aggregating multiple cells having different frequency bands. The cells having different frequency bands are grouped into any one of cell groups, each of which includes cells having an identical transmission timing. The method includes adjusting, by using the mobile station, the transmission timing of each of the cell groups which are set from the base station; receiving, by using the mobile station, information describing whether or not a transmission timing before a handover for each of the cell groups is to be applied after the handover, from the base station, and storing the information; and applying, by using the mobile station, the transmission timing before the handover to the transmission timing after the handover, for the cell groups to which the transmission timing before the handover is to be applied after the handover.

(11) A method of the subject application for managing a synchronization state is a method for a mobile station that communicates with a base station by aggregating multiple cells having different frequency bands. The cells having different frequency bands are grouped into any one of cell groups, each of which includes cells having an identical transmission timing. The method includes adjusting, by using the mobile station, the transmission timing of each of the cell groups which are set from the base station; and applying, by using the mobile station, the transmission timing of a cell group including a cell allocated upon a handover to a transmission timing after the handover.

(12) An integrated circuit of the subject application is an integrated circuit of a mobile station that communicates with a base station by aggregating multiple cells having different frequency bands. The cells having different frequency bands are grouped into any one of cell groups, each of which includes cells having an identical transmission timing. The integrated circuit includes a function of adjusting the transmission timing of each of the cell groups which are set from the base station; and a function of setting whether or not the transmission timing adjusted for each of the cell groups is to be applied after the handover, on the basis of information which is transmitted from the base station and which describes whether or not a transmission timing before a handover for each of the cell groups is to be applied after the handover.

(13) An integrated circuit of the subject application is an integrated circuit of a mobile station that communicates with a base station by aggregating multiple cells having different frequency bands. The cells having different frequency bands are grouped into any one of cell groups, each of which includes cells having an identical transmission timing. The integrated circuit includes a function of adjusting the transmission timing of each of the cell groups which are set from the base station; and a function of applying the transmission timing of a cell group including a cell allocated upon a handover, to the transmission timing after the handover.

Advantageous Effects of Invention

As described above, the present invention provides a radio communication system, a mobile station, a base station, a method for managing a synchronization state, and an integrated circuit which enable the synchronization state to be managed efficiently for the mobile station to which cell groups having different timings are allocated.

DESCRIPTION OF EMBODIMENTS

Figure 1:
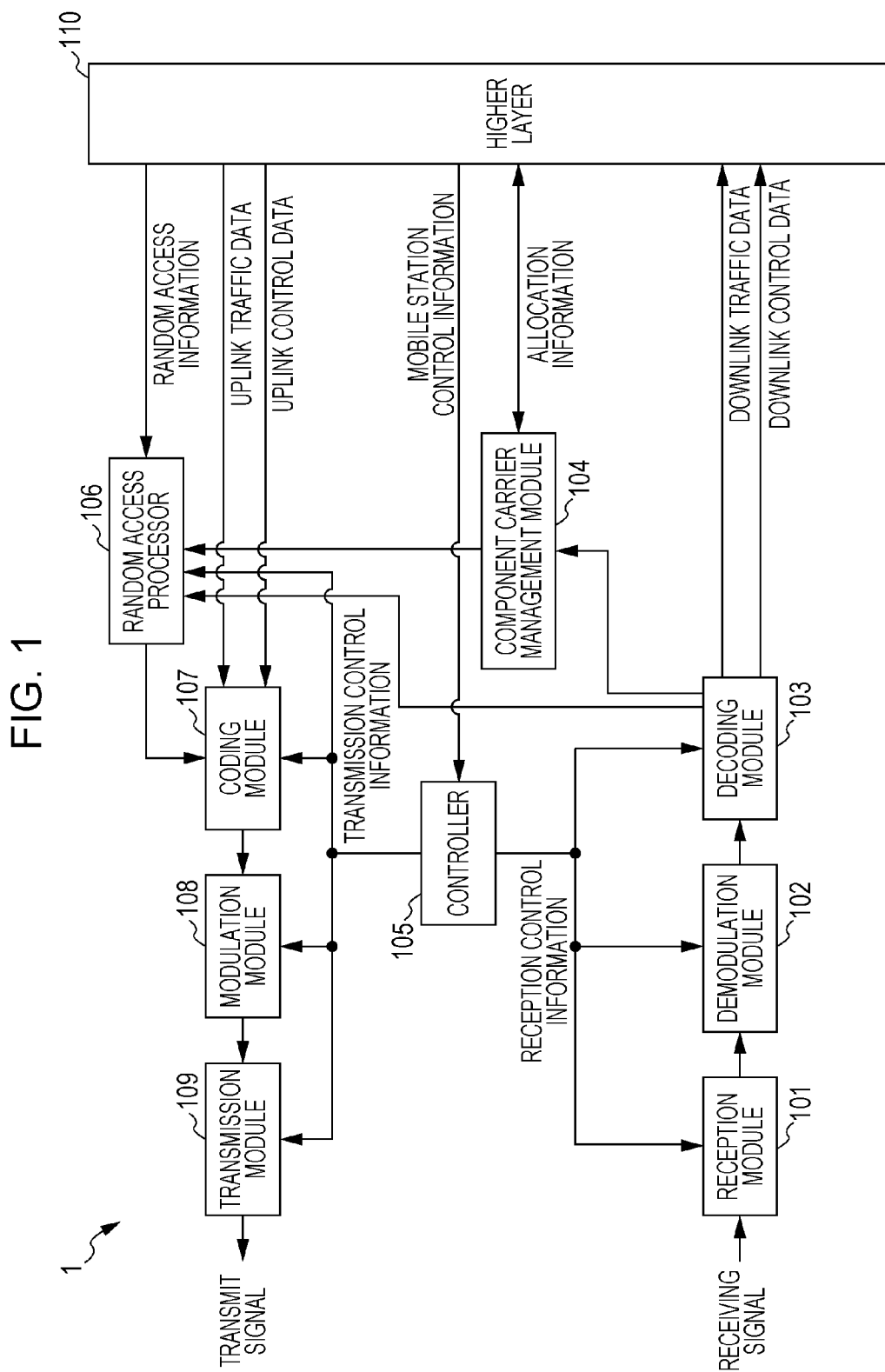
FIG. 1 is a block diagram illustrating an exemplary mobile station 1 according to an embodiment of the present invention.

Before embodiments of the present invention are described, physical channels, carrier aggregation, and a random access procedure in the present invention will be described.

(1) Physical Channels

Physical channels (or physical signals) used in EUTRA and Advanced EUTRA will be described. Physical channels include downlink channels in downlink for transmission from a base station to a mobile station, and uplink channels in uplink for transmission from a mobile station to a base station. A physical channel in EUTRA and Advanced EUTRA may be added in the future, or the configuration of physical channels may be modified. However, the modified configuration will not exert an influence on the description about embodiments of the present invention.

Synchronization signals are constituted by a primary synchronization signal of three types and a secondary synchronization signal constituted by 31 types of codes which are interleaved in the frequency domain. A combination of a primary synchronization signal and a secondary synchronization signal represents 504 physical cell identities (PCI: physical cell identify) for identifying a base station and a frame timing for achieving radio synchronization. A mobile station specifies the physical cell ID in a synchronization signal received through a cell search.

The physical broadcast channel (PBCH) is transmitted in order to transmit a notification of control parameters (broadcast information: system information) which are shared with mobile stations in a cell. For broadcast information which is not transmitted on the physical broadcast channel, the downlink control channel is used to transmit a notification of radio resources, and the downlink shared channel is used to transmit the information as a layer 3 message. As the broadcast information, for example, a cell global identifier (CGI) representing the identifier of each cell, a tracking area identifier (TAI) for managing a standby area for paging, and the like are transmitted.

A downlink reference signal is a pilot signal transmitted by using predetermined power for each cell. A downlink reference signal is a known signal which is cyclically repeated at frequency and time positions on the basis of a predetermined rule. A mobile station receives a downlink reference signal, thereby measuring reception quality for each cell. The mobile station uses a downlink reference signal also as a reference signal for demodulation of the downlink shared channel or the downlink control channel which is transmitted simultaneously with a downlink reference signal. The sequence used for a downlink reference signal is one that enables each cell to be identified. A downlink reference signal may be also referred to as a cell-specific RS (cell-specific reference signal). In this case, the use and the meaning are the same.

The downlink control channel (PDCCH: physical downlink control channel) is transmitted by using some OFDM symbols starting from the beginning of each sub-frame. The downlink control channel is used to transmit a notification of radio resource allocation information according to scheduling of a base station, an instruction to increase/decrease transmission power, an instruction to start a random access procedure, and the like to a mobile station. Before receiving/transmitting downlink data and a layer 3 message (such as paging or a handover command) which is downlink control data, a mobile station monitors the downlink control channel addressed to the mobile station. The mobile station receives the downlink control channel addressed to the mobile station, and thereby needs to obtain radio resource allocation information which is called an uplink grant in the case of transmission and which is called a downlink grant in the case of reception.

The downlink shared channel (PDSCH: physical downlink shared channel) is used to transmit a notification of paging and broadcast information as a layer 3 message which is downlink control data, as well as to transmit downlink data. Radio resource allocation information of the downlink data channel is described in the downlink control channel.

The uplink shared channel (PUSCH: physical uplink shared channel) transmits mainly uplink data and uplink control data, and may also transmit control data, such as downlink reception quality and ACK/NACK. Like downlink, radio resource allocation information of the uplink data channel is described in the downlink control channel.

The physical random access channel (PRACH) is a channel used to transmit a notification of a preamble sequence, and has guard times. The physical random access channel is used as means with which a mobile station accesses a base station. A mobile station uses the physical random access channel to request scheduling of transmission data when the uplink control channel is not established, and to request transmission timing adjustment information necessary to adjust uplink transmission timing to a reception timing window of a base station. A mobile station which has received transmission timing adjustment information (TA command) sets an effective time (value of a transmission timing timer) in the transmission timing adjustment information, and manages the uplink state as a transmission timing adjusted state during the effective time (while the transmission timing timer is counting time), and as a transmission timing non-adjusted state during time other than the effective time (when the transmission timing timer is completed or when the transmission timing timer is temporarily stopped). A base station may allocate a dedicated preamble sequence (dedicated preamble) for a mobile station and start a random access procedure. Other physical channels will not be described in detail because they are not related to the embodiments of the present invention.

(2) Carrier Aggregation

The "carrier aggregation" is a technique for performing aggregation on cells (component carriers) having different frequency bands so as to handle it as one frequency band. For example, when five component carriers having a frequency bandwidth of 20 MHz are subjected to carrier aggregation, a mobile station can access it as one having a frequency bandwidth of 100 MHz. The component carriers which are to be aggregated may have contiguous frequency bands or may have frequency bands, all or some of which are not contiguous. For example, when available frequency bands are of 800 MHz bandwidth, 2.4 GHz bandwidth, and 3.4 GHz bandwidth, a certain component carrier may be transmitted in 800 MHz bandwidth; another, in 2 GHz bandwidth; and yet another, in 3.4 GHz bandwidth.

Contiguous or non-contiguous component carriers in the same frequency band of, for example, 2.4 GHz bandwidth can be aggregated. The frequency bandwidth of each component carrier may be narrower than 20 MHz, or may be different from that of another.

One downlink component carrier and one uplink component carrier are combined to form one cell. Only one downlink component carrier may form one cell. A base station allocates cells which accord with the communication capability and/or the communication condition of a mobile station, and communicates with the mobile station via the allocated cells. In the cells allocated to the mobile station, one cell serves as a primary cell, and the other cells serve as secondary cells. In the current state of Advanced EUTRA, special functions, such as allocation of the uplink control channel PUCCH and permission to access the random access channel RACH, are set to the primary cell.

As specific operations of carrier aggregation, a base station notifies a mobile station of addition of a component carrier (secondary cell) to the mobile station, modification of parameters, and release of a component carrier. The notification is typically transmitted by using a layer 3 message (radio resource control message; RRC message). For example, when a base station adds a component carrier to a mobile station and modifies parameters, the base station notifies the mobile station of a physical cell identity or carrier frequency information, setting information of parameters regarding radio resources, and the like as a secondary cell index (sCellIndex) and the parameters for the secondary cell index. When the secondary cell corresponding to the secondary cell index in the notification is already set in the mobile station which has received the notification, the mobile station regards the notification as modification of parameters of the secondary cell. When the secondary cell index in the notification is not set, the mobile station regards the notification as addition of the secondary cell. When a cell is to be released, a secondary cell index is transmitted from the base station to the mobile station, and the mobile station releases the secondary cell information corresponding to the secondary cell index in the notification.

To achieve reduction in power consumption and efficiency of resource use of a mobile station, two states, the activated state and the deactivated state, are defined for a cell. A secondary cell just after allocation (just after addition) is in the deactivated state. A mobile station does not perform downlink reception in the secondary cell which is in the deactivated state (or ignores radio resource allocation information in the instruction on the downlink control channel), and does not perform uplink transmission. When a base station transmits an instruction to activate a secondary cell which is in the deactivated state, the mobile station switches the secondary cell to the activated state. The mobile station starts downlink reception in the secondary cell which is in the activated state (or operates in accordance with the radio resource allocation information in the instruction on the downlink control channel), and performs transmission when the synchronization state in uplink is established. When a base station transmits an instruction to deactivate a secondary cell which is in the activated state, the mobile station switches the secondary cell to the deactivated state. The primary cell is always in the activated state.

In transmission power adjustment performed when a mobile station performs transmission by using an uplink component carrier, reception quality of a downlink component carrier (e.g., a path loss which represents an amount in which power of a radio signal transmitted from a base station is attenuated until the signal is received by a mobile station) is used. In transmission power adjustment for the primary cell, downlink reception quality of the primary cell is used. In transmission power adjustment for a secondary cell, either one of downlink reception quality of the primary cell and that of the secondary cell is used. Information about whether downlink reception quality of the primary cell or that of the secondary cell is used for transmission power adjustment for the secondary cell is transmitted from the base station to the mobile station by using broadcast information or a dedicated layer 3 message (RRC message) for each mobile station.

In the case where a mobile station uses cells to communicate with a base station, the mobile station may be connected with the base station via a relay station, a repeater, or the like. In this case, both or either of the reception timing of a downlink component carrier at the mobile station and the transmission timing of each uplink component carrier to the base station may be different depending on the cell (or the cell group including one or more cells). Furthermore, a transmission timing to the base station is different depending on the uplink component carrier of each cell (or each uplink component carrier of cell groups). Therefore, the mobile station needs to adjust the transmission timing and the transmission power for each cell (cell group) so as to manage the synchronization state. Since timings of the cell group are adjusted by using the same transmission timing adjustment information (TA command), the cell group may be referred to as a TA group.

[Exemplary Communication Network Configuration in the Present Invention]

Figure 6:
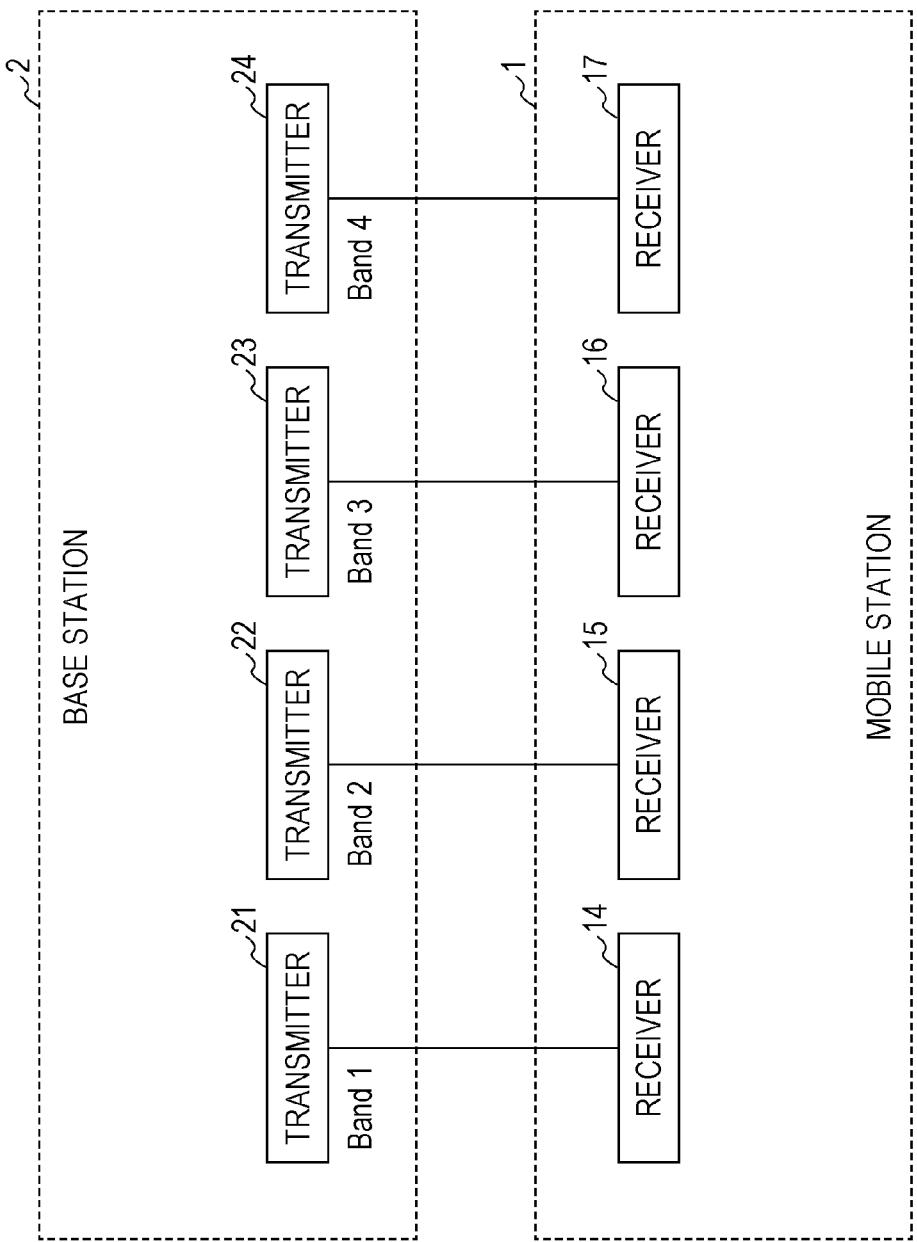
FIG. 6 is a diagram illustrating an exemplary communication network configuration according to an embodiment of the present invention.

FIG. 6 is a diagram illustrating an exemplary communication network configuration according to an embodiment of the present invention. When a mobile station 1 is capable of establishing a radio connection to a base station 2 by using frequency bands (Band 1 to Band 4) in a simultaneous manner by means of carrier aggregation, it is preferable, from the viewpoint of simplicity of control, that a communication network configuration is employed in which a certain base station 2 includes transmitters 21 to 24 (and receivers which are not illustrated) corresponding to the respective frequency bands so that one base station 2 controls the frequency bands. A configuration may be employed in which a base station 2 performs transmission in frequency bands by using one transmission apparatus, for example, on the ground that the frequency bands are contiguous. A communication range for each frequency band controlled by a transmission apparatus in the base station 2 is regarded as a cell, and is present in the same spatial area. At that time, an area (cell) covered by each frequency band may have a different size and a different shape. It is preferable, from the viewpoint of simplicity of control, that the mobile station 1 uses receivers 14 to 17 (and transmitters which are not illustrated) to communicate with the base station 2. Alternatively, a configuration may be employed in which one receiving apparatus is used to perform reception in frequency bands. A similar configuration may be employed for uplink communication.

In the description below, an area covered by the frequency of a component carrier formed by the base station 2 is referred to as a cell. Note that this may be different from the definition of a cell in a communication system which is actually operated. For example, in a certain communication system, some of component carriers used by means of carrier aggregation may be defined as additional radio resources not as a cell. Even when reference of a component carrier as a cell in the present invention causes a case in which the definition of a cell is different from that in a communication system which is actually operated, the gist of the present invention is not affected. As illustrated, the mobile station 1 may establish a radio connection to the base station 2 via a relay station (or a repeater).

Figure 7:
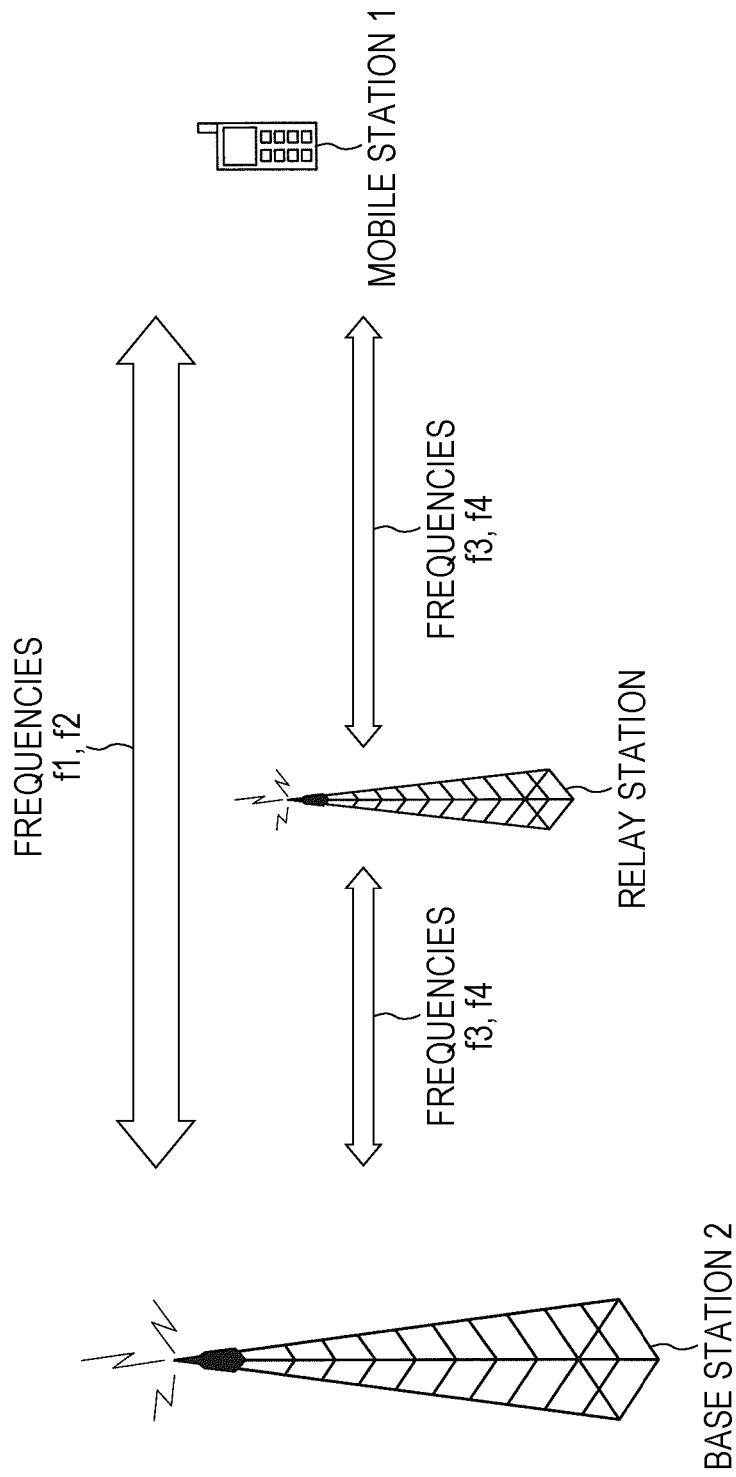
FIG. 7 is a diagram illustrating an exemplary radio communication configuration according to an embodiment of the present invention.

FIG. 7 is a diagram illustrating an exemplary radio communication configuration according to an embodiment of the present invention. In FIG. 7, it is presumed that cells for frequencies f1 and f2 and cells for frequencies f3 and f4, which are allocated to the mobile station 1, have different transmission/reception timings. Therefore, the base station 2 and the mobile station 1 manage the cells for frequencies f1 and f2 as one cell group and the cells for frequencies f3 and f4 as another cell group. The example in which the cells are managed as two cell groups is illustrated here. As a matter of course, the cells may be managed as three or more cell groups.

(3) Random Access Procedure

As a random access procedure, there are two access procedures, a contention based random access and a non-contention based random access.

The contention based random access is a random access procedure in which a collision may occur between mobile stations, and is performed, for example, when initial access is performed from a state in which a mobile station is not connected to (does not communicate with) a base station, or when scheduling request is made in the case where a mobile station is to perform uplink data transmission in a state in which the mobile station is connected to a base station but the uplink synchronization is not adjusted.

The non-contention based random access is a random access procedure in which no collisions may occur between mobile stations. The non-contention based random access is used to rapidly synchronize the uplink between a mobile station and a base station in the case where the base station and the mobile station are connected to each other but where the uplink synchronization is not adjusted. In a special case, for example, of mainly a handover or a case in which the transmission timing of a mobile station is not effective, a base station transmits an instruction to perform the non-contention based random access, and a mobile station starts the random access procedure (NPL 1). An instruction to perform the non-contention based random access is transmitted through an RRC layer message or control data on the downlink control channel PDCCH.

Figure 8:
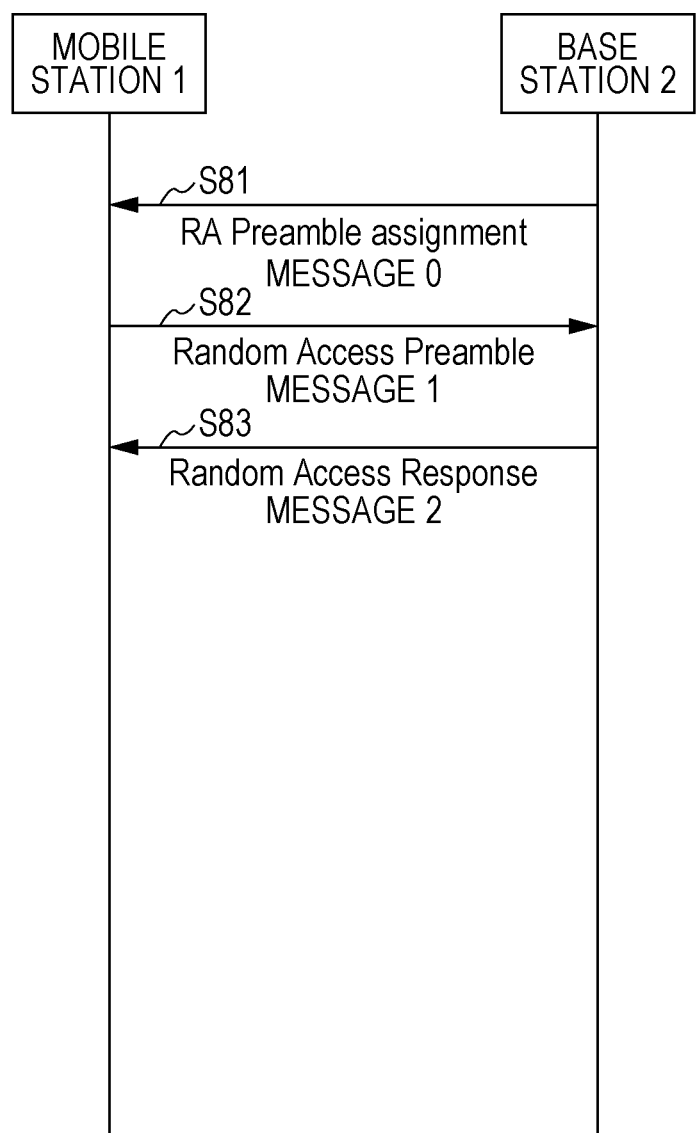
FIG. 8 is a diagram illustrating a non-contention based random access procedure in Advanced-EUTRA of the related art.

By using FIG. 8, the non-contention based random access procedure which uses the downlink control channel PDCCH and which is performed when carrier aggregation of Advanced EUTRA in the related art is performed will be described. A base station uses the downlink control channel PDCCH of the primary cell to notify a mobile station of information which is necessary for the random access procedure and which is transmitted as downlink control information (DCI) (message 0, step S81). The DCI for the random access procedure is transmitted in a predetermined format (Format1A), and includes random-access preamble transmission resource allocation information (PRACH mask index) and a preamble index.

The mobile station which has received the PDCCH including the DCI addressed to the mobile station transmits the random access preamble corresponding to the specified preamble index by using the uplink resources allocated in the primary cell (message 1, step S82).

When the base station detects the random access preamble from the mobile station, the base station calculates a deviation amount of the transmission timing between the mobile station and the base station from the random access preamble. The base station arranges random access response identification information (RA-RNTI: random access-radio network temporary identity) for representing a response (random access response) to the mobile station which has transmitted the random access preamble, in the downlink control channel PDCCH. The base station transmits a random-access response message including transmission timing adjustment information based on the deviation amount of the timing, scheduling information, and identifier information of the received random access preamble, on the downlink shared channel PDSCH (message 2, step S83).

When the mobile station detects the RA-RNTI on the downlink control channel PDCCH, the mobile station checks the random-access response message arranged on the downlink shared channel PDSCH. When information about the transmitted random access preamble is included, the mobile station adjusts the uplink transmission timing on the basis of the transmission timing adjustment information included in the random-access response message. In the case where the transmission timing adjustment information is received, when the received transmission timing adjustment information is effective, the mobile station starts (or restarts) the transmission timing timer. Completion of the transmission timing timer causes the adjusted transmission timing to be ineffective. While the transmission timing is effective, the mobile station can transmit data to the base station. When the transmission timing is ineffective, only a random access preamble can be transmitted. A time period for which the transmission timing adjustment information is effective is also called an "uplink synchronization state", and a time period for which the transmission timing is ineffective is also called an "uplink non-synchronization state".

To update the uplink transmission timing after completion of the random access procedure, for example, the base station measures an uplink reference signal (a reference signal for measurement, or a reference signal for demodulation) transmitted from the mobile station, calculates transmission timing adjustment information, and notifies the mobile station of a transmission timing message including the calculated transmission timing adjustment information. When the mobile station adjusts the uplink transmission timing on the basis of the transmission timing adjustment information received from the base station, the mobile station restarts the transmission timing timer. The base station has the same transmission timing timer as that of the mobile station. When the transmission timing message is transmitted, the base station starts or restarts the transmission timing timer. Thus, the base station and the mobile station manage the uplink synchronization state. Completion of the transmission timing timer causes the adjusted transmission timing to be ineffective, and the mobile station stops uplink transmission other than transmission of a random access preamble.

In consideration of the above-described points, preferable embodiments of the present invention will be described in detail below on the basis of the accompanying drawings. In the description about the present invention, when specific description about known functions and configurations related to the present invention makes the gist of the present invention unclear, the detailed description will be skipped.

First Embodiment

A first embodiment of the present invention will be described below.

FIG. 1 is a block diagram illustrating an exemplary mobile station 1 according to the embodiment of the present invention. The mobile station 1 includes a reception module 101, a demodulation module 102, a decoding module 103, a component carrier management module 104, a controller 105, a random access processor 106, a coding module 107, a modulation module 108, a transmission module 109, a higher layer 110, and a radio transmission setting module 111.

Before reception, the higher layer 110 outputs mobile station control information to the controller 105. The controller 105 appropriately outputs the mobile station control information about reception, as reception control information to the reception module 101, the demodulation module 102, and the decoding module 103. The reception control information includes information as reception schedule information, such as demodulation information, decoding information, information about the reception frequency band, a reception timing for each channel, a multiplexing method, and radio resource arrangement information.

The reception module 101 receives a signal from the base station 2 described below, in the frequency band included in the reception control information, via one or more receivers (not illustrated), converts the received signal into a baseband digital signal, and outputs it to the demodulation module 102. The demodulation module 102 demodulates the received signal and outputs it to the decoding module 103. The decoding module 103 correctly decodes the demodulated signal on the basis of the reception control information, appropriately detaches downlink traffic data from downlink control data, and outputs these to the higher layer 110. When the downlink control data includes information about addition, modification, release, or the like of a component carrier, and/or activation/deactivation information of an allocated component carrier (or a cell obtained by joining uplink and downlink component carriers), the higher layer 110 transmits the information to the component carrier management module 104. The component carrier management module 104 (i) modifies parameters of a component carrier (cell) corresponding to a secondary cell index which is already allocated to the mobile station, or releases the component carrier, (ii) stores parameters of a component carrier (cell) corresponding to a new secondary cell index, or (iii) stores information about the activated/deactivated state of each secondary cell, on the basis of the transmitted information. When allocated secondary cells have different transmission/reception timings, information about cell groups, each of which is constituted by one or more cells which have the same transmission/reception timing, is stored. Information about the cell groups includes the transmission/reception timing for each cell group and the time-count state of the transmission timing timer. The activation/deactivation information of a component carrier may be transmitted from the decoding module 103 to the component carrier management module 104, not via the higher layer 110.

Before transmission, the higher layer 110 outputs mobile station control information to the controller 105. The controller 105 appropriately outputs the mobile station control information about transmission as transmission control information to the random access processor 106, the coding module 107, the modulation module 108, and the transmission module 109. The transmission control information includes information as uplink scheduling information of a transmit signal, such as coding information, modulation information, information about the transmission frequency band, the transmission timing of each channel, a multiplexing method, and radio resource arrangement information.

The higher layer 110 appropriately outputs uplink traffic data and uplink control data to the coding module 107 in accordance with the uplink channels. The coding module 107 appropriately encodes each data in accordance with the transmission control information, and outputs it to the modulation module 108. The modulation module 108 modulates the signal encoded by the coding module 107. The modulation module 108 multiplexes a downlink reference signal on the modulated signal, and maps it in the frequency band.

The transmission module 109 converts the frequency band signal which is output from the modulation module 108, into a time domain signal, and puts the converted signal on a carrier wave having a predetermined frequency to amplify power and transmits it from one or more transmitters (not illustrated).

When the signal decoded by the decoding module 103 includes information describing a cell group to which the transmission timing before a handover is to be applied after the handover, the information is transmitted through the higher layer 110 (or directly from the decoding module 103) to the component carrier management module 104 and the random access processor 106. The random access processor 106 determines whether or not a random access procedure is to be performed after the handover, on the basis of the transmitted information and each piece of component carrier information obtained from the component carrier management module 104.

After the handover, the component carrier management module 104 causes a cell group to which the transmission timing before the handover is to be applied, to be switched to the activated state. In a cell included in the cell group, if the transmission timing timer is counting time, uplink transmission can be performed without performing the random access procedure. Alternatively, after the handover, a cell group is switched to the deactivated state, and counting of the transmission timing timer may be continued. In the latter case, when the demodulation module 102 demodulates a signal which gives an instruction to activate the cell group and which is transmitted from the base station 2, the cells corresponding to the cell group are switched to the activated state. For the cells which are switched to the activated state, uplink transmission is performed without performing the random access procedure. The mobile station may be provided with only one transmission timing timer, or each cell group may be provided with a transmission timing timer.

The uplink shared channel on which uplink control data is arranged typically carries a layer 3 message (radio resource control message; RRC message). An RRC module in the mobile station 1 is present as part of the higher layer 110. The random access processor 106 is present as part of the MAC (medium access control) that manages the data link layer in the mobile station 1. In FIG. 1, other components of the mobile station 1 are not illustrated because they do not relate to the embodiment.

Figure 2:
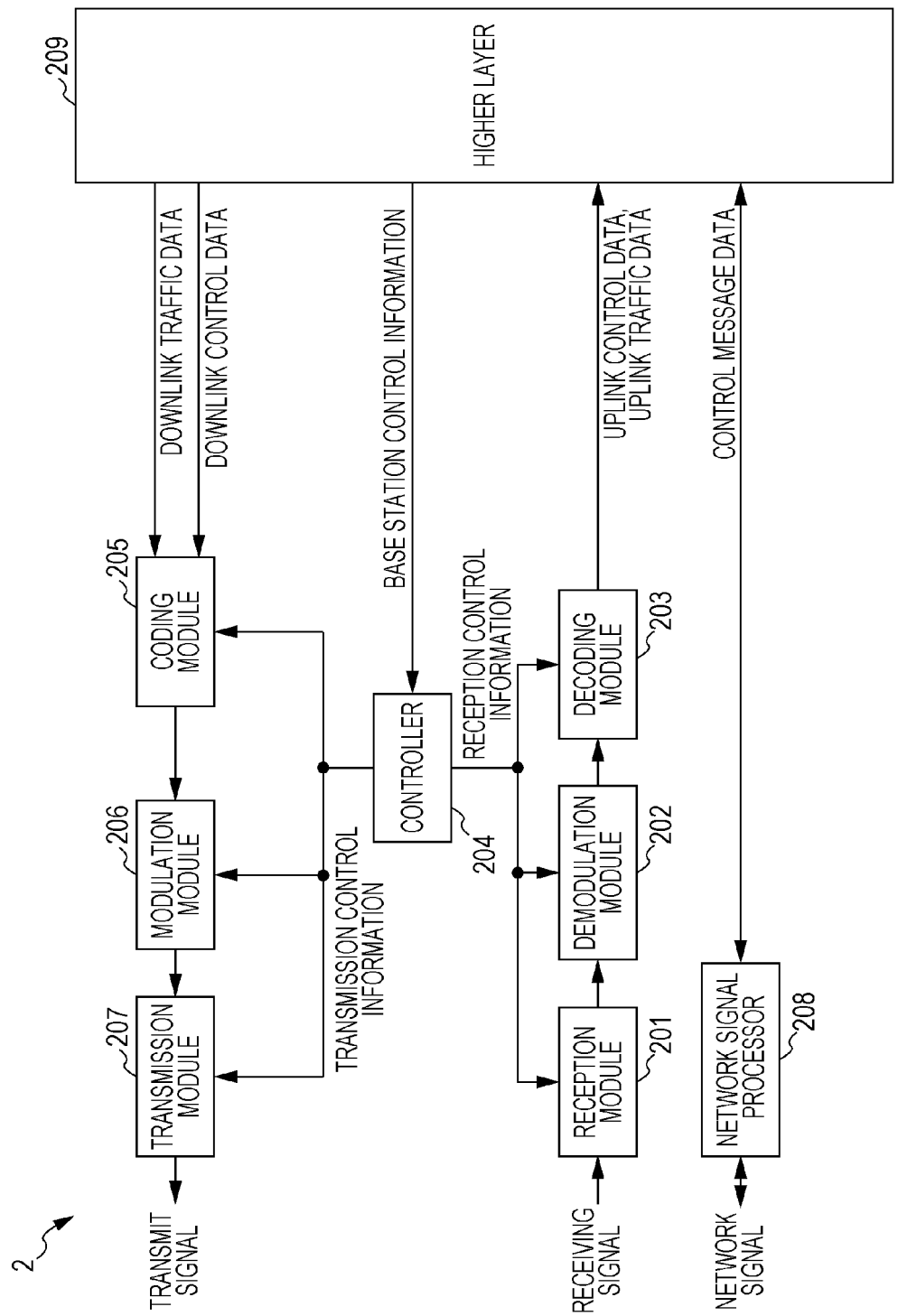
FIG. 2 is a block diagram illustrating an exemplary base station 2 according to an embodiment of the present invention.

FIG. 2 is a block diagram illustrating an exemplary base station 2 according to the embodiment of the present invention. The base station 2 includes a reception module 201, a demodulation module 202, a decoding module 203, a controller 204, a coding module 205, a modulation module 206, a transmission module 207, a network signal processor 208, and a higher layer 209.

The higher layer 209 outputs downlink traffic data and downlink control data to the coding module 205. The coding module 205 encodes data which are received, and outputs it to the modulation module 206. The modulation module 206 modulates the coded signal. The modulation module 206 multiplexes a downlink reference signal on the modulated signal, and maps it in the frequency band. The transmission module 207 converts the frequency band signal which is output from the modulation module 206 into a time domain signal, and puts the converted signal on a carrier wave having a predetermined frequency to amplify power and transmits it from one or more transmitters (not illustrated). The downlink shared channel on which downlink control data is arranged typically carries a layer 3 message (RRC message).

The reception module 201 receives a signal from a mobile station 1 in the frequency band described in the transmitted reception control information, via one or more receivers (not illustrated), converts the received signal to a baseband digital signal, and outputs it to the demodulation module 202. The demodulation module 202 demodulates the received signal and outputs it to the decoding module 203. The decoding module 203 decodes the demodulated signal, appropriately detaches uplink traffic data from uplink control data, and outputs these to the higher layer 209.

The higher layer 209 outputs base station control information which is necessary to control these blocks, to the controller 204. The controller 204 appropriately outputs the base station control information about transmission, to blocks, the coding module 205, the modulation module 206, and the transmission module 207, as transmission control information. The controller 204 appropriately outputs the base station control information about reception, to blocks, the reception module 201, the demodulation module 202, and the decoding module 203, as reception control information.

The network signal processor 208 receives or transmits a control message between base stations 2 (or a mobility management entity (MME), a gateway, or an MCE) and the base station 2. The control message is transmitted/received via a network line. The control message is transmitted on a logical interface which is called an "S1 interface", an "X2 interface", an "M1 interface", or an "M2 interface".

An RRC module of the base station 2 is present as part of the higher layer 209. In FIG. 2, other components of the base station 2 are not illustrated because they do not relate to the embodiment.

A handover procedure in the communication system according to the present embodiment will be described by using FIG. 3. In the present embodiment, an example in which a handover causes the mobile station 1 to move to a cell which belongs to a base station (target eNB) after the handover which is different from a base station (source eNB) before the handover will be described. The present invention is not limited to this, and may be applied to a mobile station moving between cells in the same base station, especially to a mobile station changing the primary cell.

Figure 3:
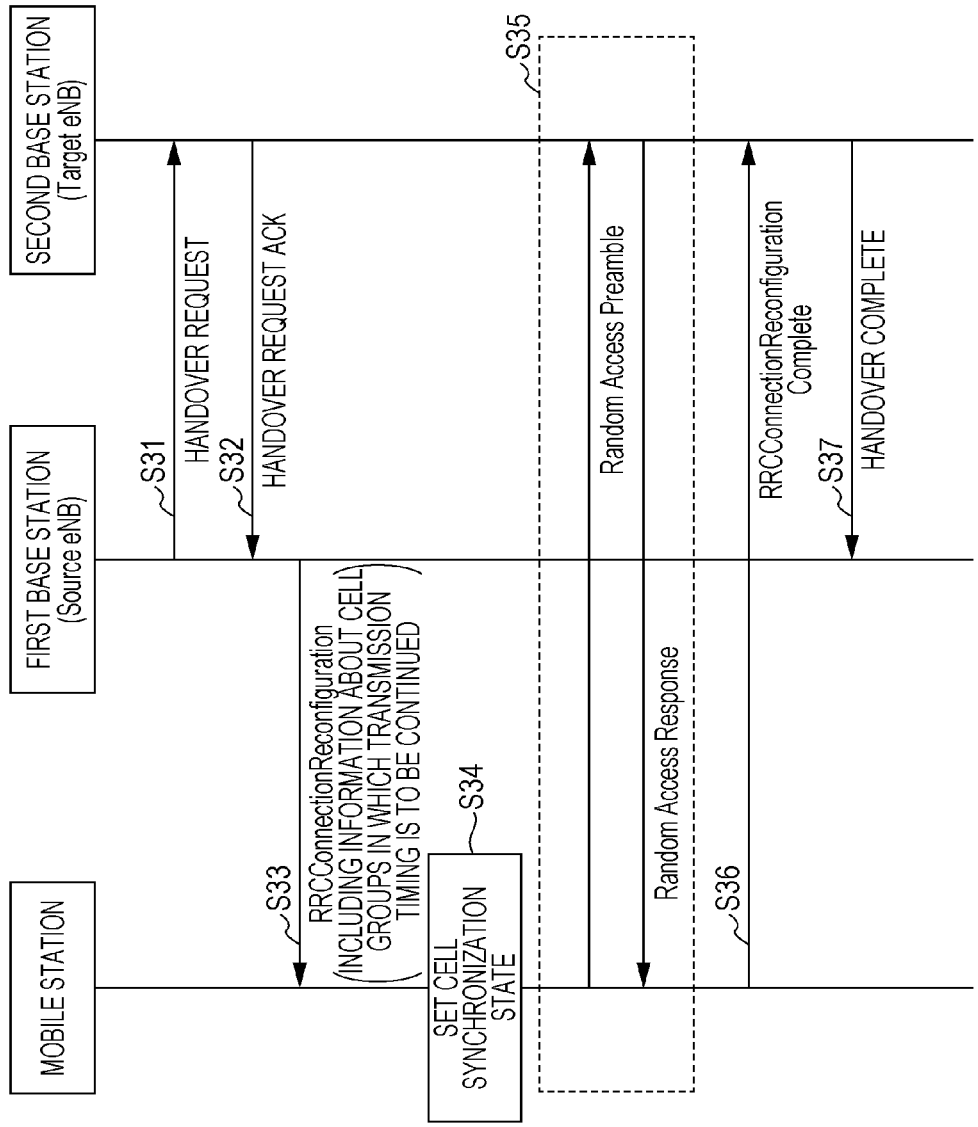
FIG. 3 is a diagram for describing a handover procedure according to a first embodiment of the present invention.

In FIG. 3, a first base station notifies a second base station of a handover request message (HANDOVER REQUEST) for a mobile station (in step S31). The handover request message includes information about communication capability of the mobile station, allocation information of network resources, and allocation information of radio resources (such as allocation information of a secondary cell). When the second base station, which has received the handover request message in step S31, acknowledges the handover, the second base station notifies the first base station of a handover request acknowledgment message (HANDOVER REQUEST ACK) (in step S32). The handover request acknowledgment message includes allocation information of a secondary cell and cell group information of the cell (when it is necessary to change a cell), and information about transmission timing setting after the handover for the cell group. The first base station, which has received the handover request acknowledgment message, notifies the mobile station of an RRC connection reconfiguration message (RRCConfigurationReconfiguration) including information about the transmission timing setting, and instructs the mobile station to perform the handover (in step S33).

The mobile station, which has received the RRC connection reconfiguration message, sets a synchronization state of the cell which is the target of the handover, on the basis of the information about the transmission timing setting included in the message (in step S34). The mobile station determines whether or not the transmission timing of a cell group including the primary cell after the handover is one to which the transmission timing of the cell group before the handover is to be applied. If the primary cell is not a cell in the cell group to which the transmission timing before the handover is to be applied, as in the related art, the mobile station performs the non-contention based random access on the primary cell which is the target of the handover (in step S35). When a connection to the cell which is the target of the handover is successfully established, the mobile station transmits an RRC connection reconfiguration completion message (RRCConfigurationReconfigurationComplete) in the cell to which the connection has been successfully established (in step S36). The second base station, which has received the RRC connection reconfiguration completion message, notifies the first base station that the handover is completed (HANDOVER COMPLETE) (in step S37). In step S34, if the primary cell after the handover is a cell in the cell group which includes the primary cell and to which the transmission timing of the cell group before the handover is to be applied, the mobile station does not perform the random access process in step S35, and transmits an RRC connection reconfiguration completion message in step S36. When uplink resources for transmitting an RRC connection reconfiguration completion message are not allocated to the mobile station, a request for allocation of uplink resources needs to be transmitted by using the random access procedure.

In step S34, the mobile station performs the following operations also for cell groups other than the cell group including the primary cell on the basis of the information about the transmission timing setting. The mobile station (i) maintains the activated state or the cell state before the handover (the activated state or the deactivated state) for the cells in the cell group to which the transmission timing before the handover is to be applied after the handover, and (ii) sets the deactivated state after the handover, as in the related art, to the cells in a cell group to which the transmission timing before the handover is not to be applied after the handover.

After the handover is completed, the second base station allocates resources to the mobile station on the basis of the cell states and the cell synchronization states of the mobile station. That is, in the case where resources are to be allocated to a cell of the mobile station in a cell group to which the transmission timing before the handover is applied after the handover, when the cell is in the activated state, the resources are allocated in a normal manner. When the cell is in the deactivated state, an instruction to activate the cell is transmitted, and uplink resources are allocated without performing the random access procedure.

Alternatively, while cells other than the primary cell are switched to the deactivated state after the handover, the transmission timing timer may continue to count time for the cells in a cell group to which the transmission timing before the handover is to be applied after the handover. In this case, when the mobile station receives a message that the cells in a cell group to which the transmission timing before the handover is to be applied after the handover be activated, from the base station, the mobile station activates the cells, and performs uplink transmission without performing the random access procedure.

As described above, the mobile station receives information for each cell group about whether or not the transmission timing before the handover is to be applied after the handover when the handover is performed, so as to set the cell states (the activated state or the deactivated state) and the cell synchronization states (whether or not the random access procedure needs to be performed) after the handover on the basis of the information. The base station also determines allocation of resources to the mobile station and whether or not an instruction to perform the random access procedure is to be transmitted, on the basis of the information. Therefore, an unnecessary activation instruction, unnecessary execution of the random access procedure, or the like may be avoided, enabling efficient resource use and management of the synchronization state to be achieved.

In the present embodiment, information for each cell group about whether or not the transmission timing before the handover is to be applied after the handover may be information about whether or not the transmission timing timer is to continue to count time, or may be information about whether or not the random access procedure needs to be performed. The information may be provided for each cell or each cell group as one-bit information and may be included in the RRC connection reconfiguration message.

In the present embodiment, the case in which the RRC connection reconfiguration message includes MCI (mobiilty control info) is presumed in step S33. Alternatively, the embodiment may be applied to a case in which the RRC connection reconfiguration message does not include MCI (a case in which the primary cell is changed by changing parameters of a cell, not through the handover). For example, when the primary cell is changed to a cell in a cell group to which the transmission timing before the handover is to be applied after the handover, or when a secondary cell for which the transmission timing timer is counting time is changed to the primary cell, the mobile station may transmit the RRC connection reconfiguration completion message in step S36 without performing the random access process in step S35.

Second Embodiment

A second embodiment of the present invention will be described below.

The configurations of the mobile station 1 and the base station 2 which are used in the present embodiment are the same as those according to the first embodiment in FIGS. 1 and 2, and will not be described.

In the first embodiment, the example in which the first base station transmits information about a cell group to which the transmission timing before a handover is to be applied after the handover is described. In the present embodiment, an example in which information about a cell or a cell group which is to be switched to the activated state after the handover is transmitted will be described. That is, in the present embodiment, when a signal decoded by the decoding module 103 of the mobile station 1 includes information about a cell or a cell group which is to be switched to the activated state after the handover, the information is transmitted to the component carrier management module 104 via the higher layer 110 (or directly from the decoding module 103). After the handover, the random access processor 106 determines whether or not the transmission timing before the handover is to be applied after the handover, on the basis of the cell states obtained from the component carrier management module 104.

A handover procedure in the communication system according to the present embodiment will be described by using FIG. 4. In the present embodiment, an example in which a base station (source eNB) which is the source of the handover is the same as a base station (target eNB) which is the target of the handover (an example preferable for an operation performed when the primary cell is changed) will be described. However, the present invention is not limited to this, and the present embodiment may be applied to a case of a mobile station moving from a cell of a base station to a cell of another base station.

Figure 4:
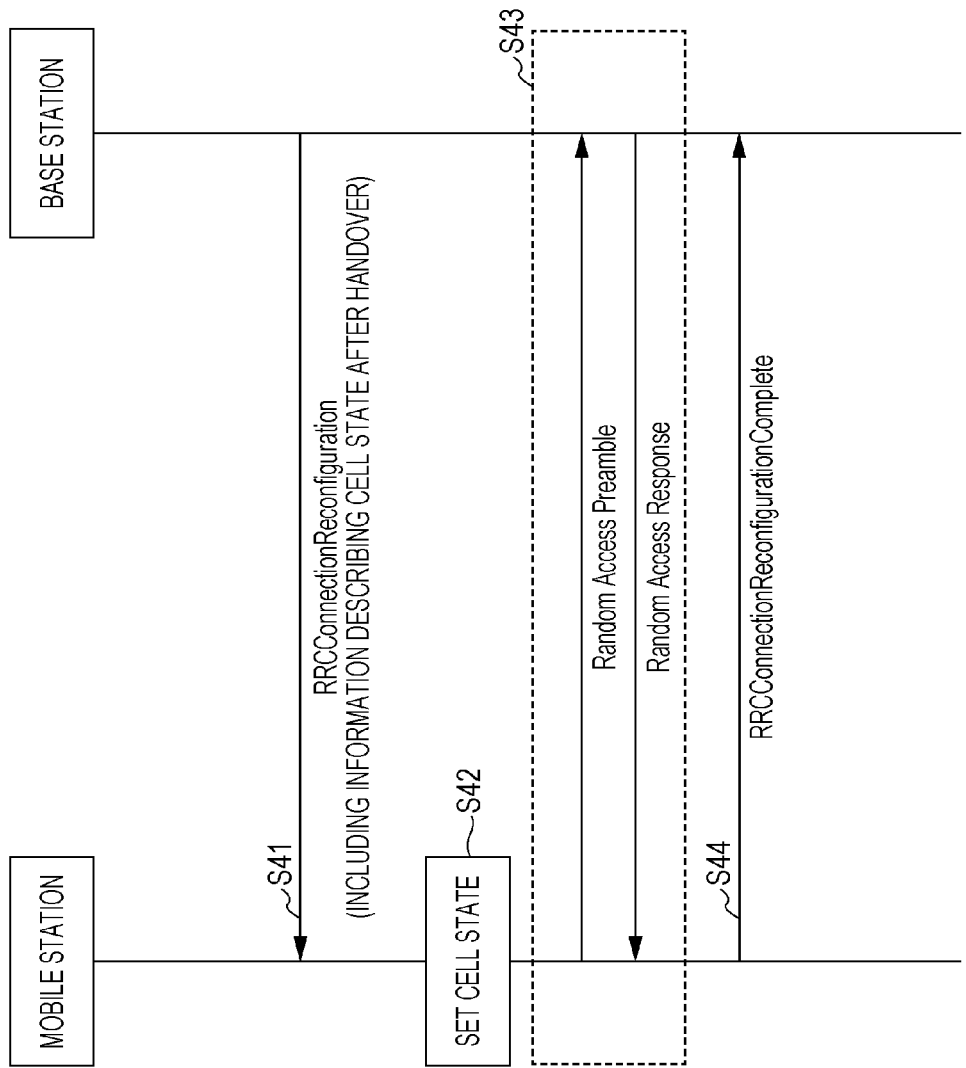
FIG. 4 is a diagram for describing a handover procedure according to a second embodiment of the present invention.

In FIG. 4, a base station notifies a mobile station of an RRC connection reconfiguration message (RRCConfigurationReconfiguration) including information describing the cell state after the handover, and instructs the mobile station to perform the handover (in step S41).

The mobile station, which has received the RRC connection reconfiguration message, sets a cell which is the target of the handover and its cell state on the basis of information which describes the cell state after the handover and which is included in the message (in step S42). The mobile station determines whether or not the information describes that the primary cell which is the target of the handover, or the cell group including the primary cell is to be switched to the activated state. If the primary cell which is the target of the handover, or the cell group including the primary cell is to be switched to the deactivated state, the mobile station performs the non-contention based random access on the primary cell which is the target of the handover, as in the related art (in step S43). When a connection to the cell which is the target of the handover is successfully established, the mobile station transmits an RRC connection reconfiguration completion message (RRCConfigurationReconfiguration-Complete) in the cell to which the connection has been successfully established (in step S44). In step S42, if the primary cell which is the target of the handover, or the cell group including the primary cell is to be switched to the activated state, the mobile station applies the transmission timing before the handover for the cell group including the primary cell to that after the handover, and transmits the RRC connection reconfiguration completion message in step S44 without performing the random access process in step S43. When uplink resources for transmitting an RRC connection reconfiguration completion message are not allocated to the mobile station, the mobile station needs to request allocation of uplink resources by using the random access procedure.

In step S42, the mobile station also sets the cell state for cells other than the primary cell and other cell groups on the basis of information about the cell states (the activated state or the deactivated state) after the handover which is included in the RRC connection reconfiguration message. For a cell or a cell group which has been set to the activated state on the basis of the information, the mobile station applies the transmission timing before the handover to that after the handover, whereas, for a cell or a cell group which has been set to the deactivated state, the mobile station does not apply the transmission timing before the handover to that after the handover.

After the handover, the base station allocates resources to the mobile station on the basis of the cell states which have been set to the mobile station. That is, when resources in the mobile station are to be allocated to a cell or a cell group which is to be switched to the activated state, the resources are allocated without performing the random access procedure.

As described above, when the handover is to be performed, the mobile station receives setting information of the cell states after the handover, so as to set the cell states and the cell synchronization states (whether or not the random access procedure needs to be performed) after the handover on the basis of the information. The base station also determines allocation of resources to the mobile station and whether or not an instruction to perform the random access procedure needs to be transmitted, on the basis of the information. Therefore, an unnecessary activation instruction, unnecessary execution of the random access procedure, or the like may be avoided, enabling efficient resource use and management of the synchronization state to be achieved.

In the present embodiment, the setting information of the cell states after the handover may be provided for each cell or each cell group as one-bit information and may be included in the RRC connection reconfiguration message.

In the present embodiment, the case in which the RRC connection reconfiguration message includes MCI is presumed in step S41. Alternatively, the present embodiment may be applied to a case in which the RRC connection reconfiguration message does not include MCI (a case in which the primary cell is changed by changing parameters of a cell, not through the handover). For example, when the primary cell is changed to a cell which is to be switched to the activated state, or to a cell in a cell group which is to be switched to the activated state, the mobile station may transmit the RRC connection reconfiguration completion message in step S44 without performing the random access process in step S43.

Third Embodiment

A third embodiment of the present invention will be described.

The configurations of the mobile station 1 and the base station 2 which are used in the present embodiment are the same as those according to the first embodiment in FIGS. 1 and 2, and will not be described.

In the first embodiment, the example in which the first base station transmits information about a cell group to which the transmission timing before a handover is to be applied after the handover is described. In the present embodiment, an example in which only cells of a cell group to which the transmission timing before a handover is applied after the handover are allocated to the mobile station when the handover is performed will be described. That is, in the present embodiment, when a signal decoded in the decoding module 103 of the mobile station 1 includes allocation information of cells after the handover, the information is transmitted to the component carrier management module 104 via the higher layer 110 (or directly from the decoding module 103). After the handover, the random access processor 106 applies the transmission timing before the handover to that after the handover, for all cells obtained from the component carrier management module 104.

A handover procedure in the communication system according to the present embodiment will be described by using FIG. 5. In the present embodiment, an example in which a base station (source eNB) which is the source of the handover is the same as a base station (target eNB) which is the target of the handover (an example preferable for an operation performed when the primary cell is changed) will be described. However, the present invention is not limited to this, and the present embodiment may be applied to a case of a mobile station moving from a cell of a base station to a cell of another base station.

Figure 5:
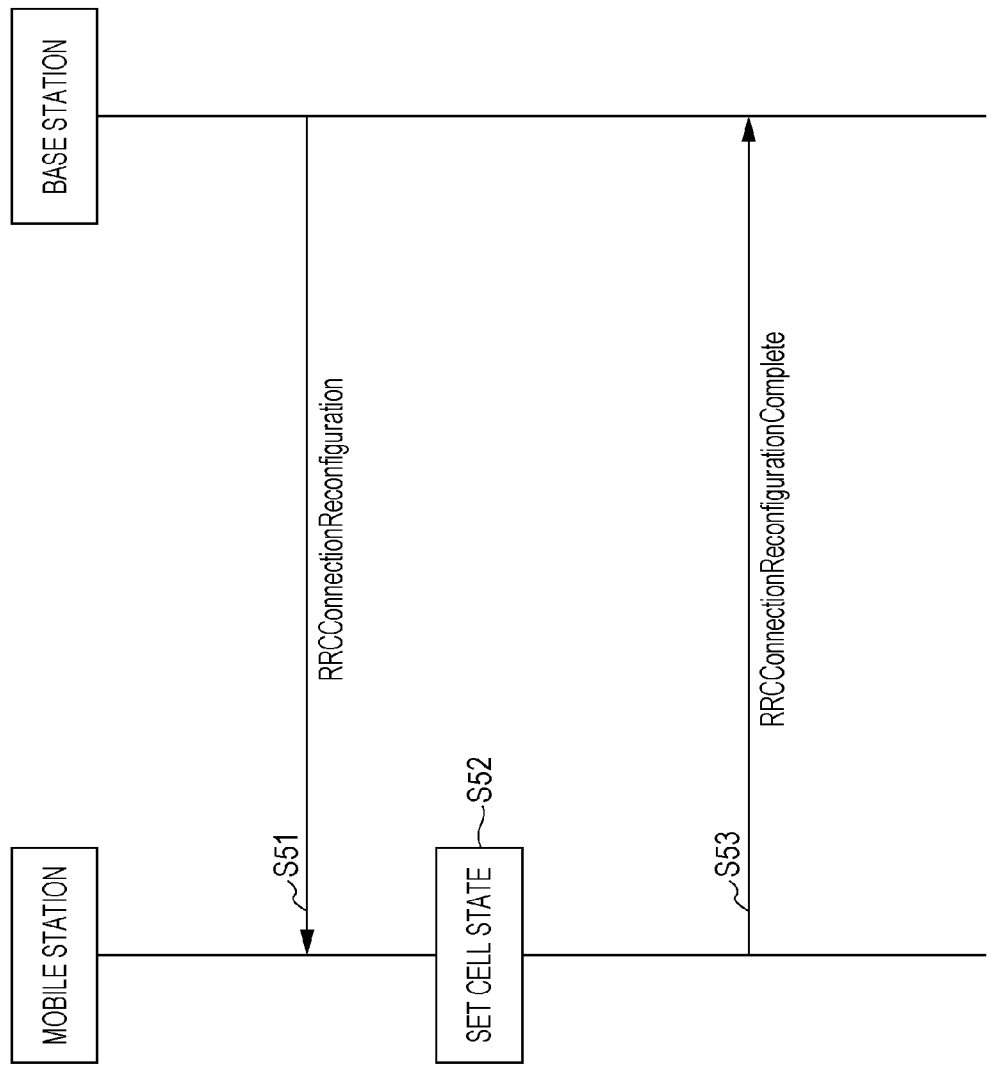
FIG. 5 is a diagram for describing a handover procedure according to a third embodiment of the present invention.

In FIG. 5, a base station notifies a mobile station of an RRC connection reconfiguration message (RRCConfigurationReconfiguration) including information for allocating only cell groups to which the transmission timing before the handover is applied after the handover, and instructs the mobile station to perform the handover (in step S51).

The mobile station, which has received the RRC connection reconfiguration message, sets the cells which are the target of the handover and their cell states, on the basis of the allocation information of the cells included in the message (in step S52). For all of the cell groups, the mobile station applies the transmission timing of each cell group before the handover to that after the handover, and transmits an RRC connection reconfiguration completion message (RRCConfigurationReconfigurationComplete) in a cell to which a connection has been established and which is the target of the handover, without performing the random access process (in step S53).

Upon the handover, the mobile station applies the transmission timing before the handover to all of the allocated cell groups. At that time, the mobile station may switch all of the secondary cells to the deactivated state after the handover as in the related art, or may maintain the activated state. The base station allocates resources to the mobile station on the basis of the cell states and the cell synchronization states. That is, when the base station is to allocate resources to a cell allocated to the mobile station in the handover, since the transmission timing before the handover has been applied to the cell after the handover, the mobile station can perform uplink transmission without performing the random access procedure. Cells and cell groups which need execution of the random access procedure are allocated through the RRC connection reconfiguration message after the handover. That is, when cells which are not included in a cell group allocated in the handover are to be allocated after the handover, in order to perform uplink transmission, the mobile station needs to perform the random access procedure so as to adjust the transmission timing.

As described above, upon the handover, in the mobile station, only cells of cell groups to which the transmission timing before the handover is applied after the handover are allocated. It is not necessary to perform a complicated process of setting the transmission timing, enabling efficient resource use and management of the synchronization state to be achieved.

The above-described embodiments are merely examples. The present invention may be achieved by using various modified embodiments and replaced embodiments.

In the above-described embodiments, a similar process is performed for the case in which the RRC connection reconfiguration message includes MCI and the case in which the RRC connection reconfiguration message does not include MCI. The present invention is not limited to this. When the RRC connection reconfiguration message includes MCI, a handover of the related art may be performed. Only when the RRC connection reconfiguration message does not include MCI, the process according to the technique of the subject application may be performed. In this case, the RRC connection reconfiguration message explicitly does not include information about transmission timing settings, and information describing that a cell group which is in the synchronization state before a handover is to have the same transmission timing after the handover may be implicitly set.

For convenience of description, the mobile station and the base station according to the embodiments are described by using functional block diagrams. Alternatively, programs for achieving functions of the units of the mobile station and the base station or achieving some of these functions are stored in a computer-readable recording medium, and the programs stored in the recording medium are installed and executed in a computer system, whereby the mobile station and the base station may be controlled. A "computer system" here encompasses an OS and hardware such as peripheral devices.

A "computer-readable recording medium" is a portable medium, such as a semiconductor medium (such as a RAM or a nonvolatile memory card), an optical recording medium (such as a DVD, an MO, an MD, a CD, or a BD), or a magnetic recording medium (such as a magnetic tape or a flexible disk), or a storage which is included in the computer system, such as a disk unit. A "computer-readable recording medium" also encompasses what dynamically holds programs for a short time period, such as a communication wire at the time when the programs are transmitted through a network such as the Internet or a communication line such as a telephone line, and also encompasses what holds programs for a certain time period, such as a volatile memory in a computer system which serves as a server or a client in such a case. The above-described programs may be those for achieving some of the above-described functions, and may be those for achieving the above-described functions through a combination of programs which are already stored in a computer system.

The functional blocks of the mobile station and the base station used in the above-described embodiments may be typically achieved as an LSI which is an integrated circuit. The functional blocks may be provided as individual chips, or may be provided as chips obtained by integrating some or all of the blocks. The technique for an integrated circuit may be achieved by using not only an LSI but also a dedicated circuit or a general-purpose processor. In the case where advances in the semiconductor technology allow a substitute technique for an LSI which aims to produce an integrated circuit to come along, an integrated circuit using the technique may be used.

The embodiments of the present invention are described in detail with reference to the drawings. The specific configuration is not limited to that in the embodiments. For example, a design obtained without departing from the gist of the invention may be included in the scope of the claims.

REFERENCE SIGNS LIST 1 mobile station
2 base station
14 to 17 receiver
21 to 24 transmitter
101, 201 reception module
102, 202 demodulation module
103, 203 decoding module
104 component carrier management module
105, 204 controller
106 random access processor
107, 205 coding module
108, 206 modulation module
109, 207 transmission module
110, 209 higher layer
208 network signal processor

The invention claimed is:

1. A mobile station that communicates with a base station by aggregating a plurality of cells having different frequency bands, the mobile station comprising:
a processor; and
a memory storing instructions,
wherein the plurality of cells having different frequency bands are grouped into any one of cell groups, each of which includes cells having an identical transmission timing, and
wherein the memory stores instructions that cause the processor to:
adjust the transmission timing of each of the cell groups, the transmission timing for each cell group being set from the base station based on transmission timing adjustment information, and set whether or not the transmission timing adjusted before a connection reconfiguration for each of the cell groups is to be applied after the connection reconfiguration, on the basis of information which is different from the transmission timing adjustment information and describes for each of the cell groups whether or not the transmission timing before the connection reconfiguration is to be applied after the connection reconfiguration and which is transmitted from the base station, wherein the connection reconfiguration is an RRC connection reconfiguration and the information which is different from the transmission timing adjustment information is an RRC connection reconfiguration message, wherein the RRC connection reconfiguration message is information for specifying, for each of the cell groups, whether or not a random access procedure is required to be performed after the RRC connection reconfiguration, and in a case that it is specified, based on the RRC connection reconfiguration message, that (i) the random access procedure is not required for a first cell group of the cell groups and (ii) the random access procedure is required for a second cell group of the cell groups, (a) the transmission timing adjusted before the RRC connection reconfiguration for the first cell group is applied after the RRC connection reconfiguration and (b) the transmission timing adjusted before the RRC connection reconfiguration for the second cell group is adjusted after the RRC connection reconfiguration.

2. A base station that communicates with a mobile station by aggregating a plurality of cells having different frequency bands, the base station comprising:

a transmitter, wherein the plurality of cells having different frequency bands are grouped into any one of cell groups, each of which includes cells having an identical transmission timing, and wherein the transmitter transmits transmission timing adjustment information for adjusting the transmission timing of each of the cell groups, and the transmitter transmits information which is different from the transmission timing adjustment information and describes whether or not a transmission timing adjusted before a connection reconfiguration for each of the cell groups of the mobile station is to be applied after the connection reconfiguration, wherein the connection reconfiguration is an RRC connection reconfiguration, and the information which is different from the transmission timing adjustment information is an RRC connection reconfiguration message, wherein the RRC connection reconfiguration message is information for specifying, for each of the cell groups, whether or not a random access procedure is required to be performed after the RRC connection reconfiguration, and in a case that it is specified, based on the RRC connection reconfiguration message, that (i) the random access procedure is not required for a first cell group of the cell groups and (ii) the random access procedure is required for a second cell group of the cell groups, (a) the transmission timing adjusted before the RRC connection reconfiguration for the first cell group is applied after the RRC connection reconfiguration and (b) the transmission timing adjusted before the RRC connection reconfiguration for the second cell group is adjusted after the RRC connection reconfiguration.

* * * * *